Nov. 7, 1967 O. J. HANAS ET AL 3,351,842

COAXIAL DIODE CARTRIDGE

Filed Dec. 23, 1964 2 Sheets-Sheet 1

INVENTORS
OREST J. HANAS
RAYMOND D. ALABURDA

BY Henry Hansen
William C. Everett
ATTORNEYS

INVENTORS
OREST J. HANAS
RAYMOND D. ALABURDA
BY Henry Hansen
William C. Everett
ATTORNEYS United States Patent Office 3,351,842
Patented Nov. 7, 1967

3,351,842
COAXIAL DIODE CARTRIDGE
Orest J. Hanas, Philadelphia, Pa., and Raymond D. Alaburda, Somerdale, N.J., assignors, by mesne assignments, to the United States of America as represented by Secretary of the Navy
Filed Dec. 23, 1964, Ser. No. 420,841
24 Claims. (Cl. 321—69)

ABSTRACT OF THE DISCLOSURE

A coaxial diode cartridge for frequency multipliers having a single or plural varactor diodes spaced predetermined distances, each diode being connected between portions of a respective cross conductor and positioned within a respective varactor housing. One portion of each of the cross conductors is connected to the center conductor of a coaxial line which center conductor is slidably connected at its ends to the outer sheath of the line through rotatable input and output loops contained within adjustable resonant cavities. The other portions of the cross conductors are connected at selectively adjustable positions along their lengths to their respective varactor housings which, in turn, are capacitor coupled to the outer sheath of the coaxial line. A power supply for reverse biasing the varactor diode is connected between the outer sheath and the varactor housing.

Figures 1, 3:
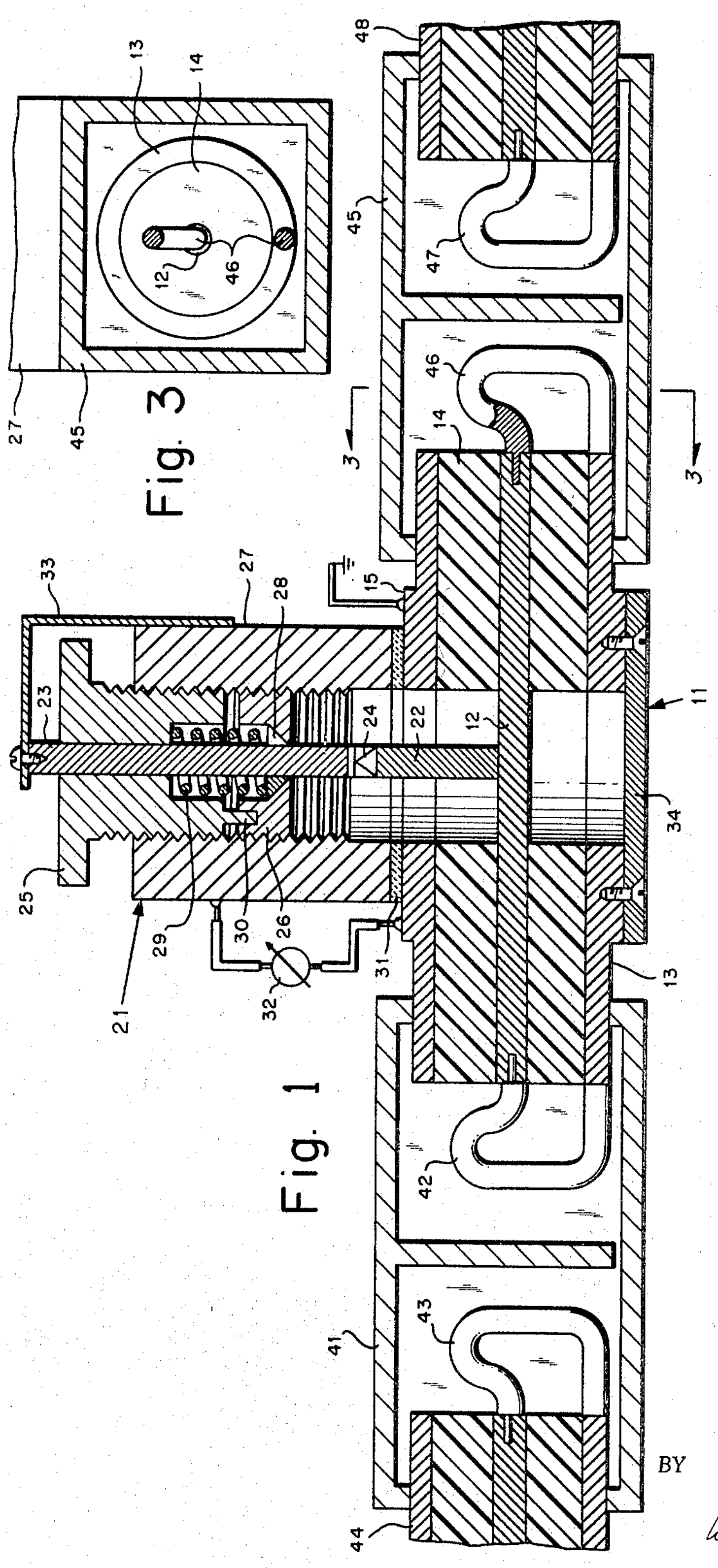

The present invention relates to frequency multipliers and more particularly to a solid state frequency multiplier utilizing a varactor diode in a cartridge with an input and output leg.

One of the most critical problems confronting designers of varactor frequency multipliers has been to match the impedance of the input and output loops of the multiplier to the respective impedances of the input and output legs and the varactors. Particularly this is a problem in microwave devices where the wave length of the output frequency after several multiplications is quite short. Under these circumstances, matching of impedances becomes a serious problem in practice, and prior art devices frequently operated in a partially unmatched condition, which resulted in serious loss in output power. Another problem is that power is limited by the amount of heat that can be dissipated from the varactor diodes. Poor heat conduction due to lack of firm grounding limited varactor frequency multipliers to low power operation. A further problem is that the varactor diode was supported by tuning fingers, which would vary the ground under any vibration, thereby modulating the output.

The general purpose of this invention is to provide a coaxial cartridge for a frequency multiplier in which the adjustment of the input and output impedances is accomplished with sufficient degrees of freedom that the impedance of the varactor may be exactly matched to the impedances of the input and output loops. To attain this, the invention contemplates a center conductor connected to input and output loops in respective resonant cavities, each of which loops may be adjusted by degree of insertion in the resonant cavity and in angle of insertion to control its impedance, and a cross conductor containing one or more varactor diodes at a selected point grounded to a varactor housing which is connected by a capacitance to ground. The characteristic of the varactor diode is that its impedance may be varied by the degree of back biasing that is applied between the varactor housing and ground. The short between the cross conductor containing the varactor diode and the varactor housing is also variable to vary the inductive impedance in series with the capacitive impedance of the varactor diode in order to tune the varactor cartridge to the frequencies handled by the cartridge. From the input loop of the cartridge to the diode is a quarter wave length of the input frequency, and from the diode to the output loop is a quarter wave length of the output frequency. By constructing the cartridge such that the second length is one-half of the first length, one can make a frequency doubler, by making it one-third, one can make a frequency tripler, etc. The invention may provide a coaxial bandpass filter at twice the input frequency as an idler in the case of a tripler or quadrupler. The invention also provides a means for locking the variable short between the cross conductor and the varactor housing. To achieve this, the invention contemplates a spring biased split shim which clamps on to the cross conductor, the spring action also serving to wedge the short against the varactor housing. This locking means provides a firm locked contact between the cross conductor and the varactor housing which is not subject to modulation by vibrations to which the varactor cartridge would be subject in actual use. The relatively large diameter cross conductor provides easy dissipation of heat to the varactor housing.

Accordingly, it is an object of the present invention to provide a solid state varactor cartridge for a frequency multiplier with a multiplicity of degrees of freedom for complete impedance matching of input and output circuits.

Another object is to provide a varactor cartridge with means to lock the cross conductor to the varactor housing to provide resistance to vibration.

Yet another object is to provide a varactor cartridge with a high level of heat dissipation for high power capacity.

A further object of the invention is to provide a varactor cartridge with a coaxial bandpass filter at the center conductor to provide an idler bypass for a frequency tripler or quadrupler.

Still another object of the invention is to provide a diode cartridge utilizing a snap diode for frequency multiplication of high levels without substantial power loss and without the use of extensive idler bandpass filters.

Yet another object of the present invention is the provision of a plurality of varactor housings in a varactor cartridge for substantially increased power output from a single cartridge.

Figure 4:
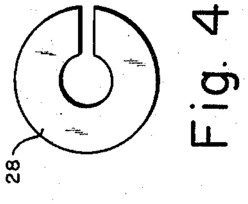
Figure 2:
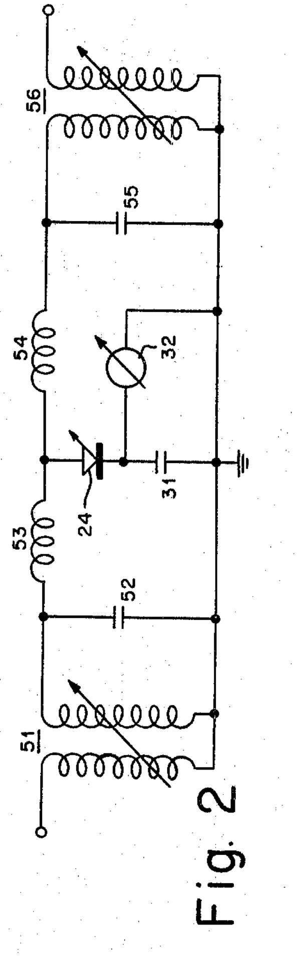
Figure 5:
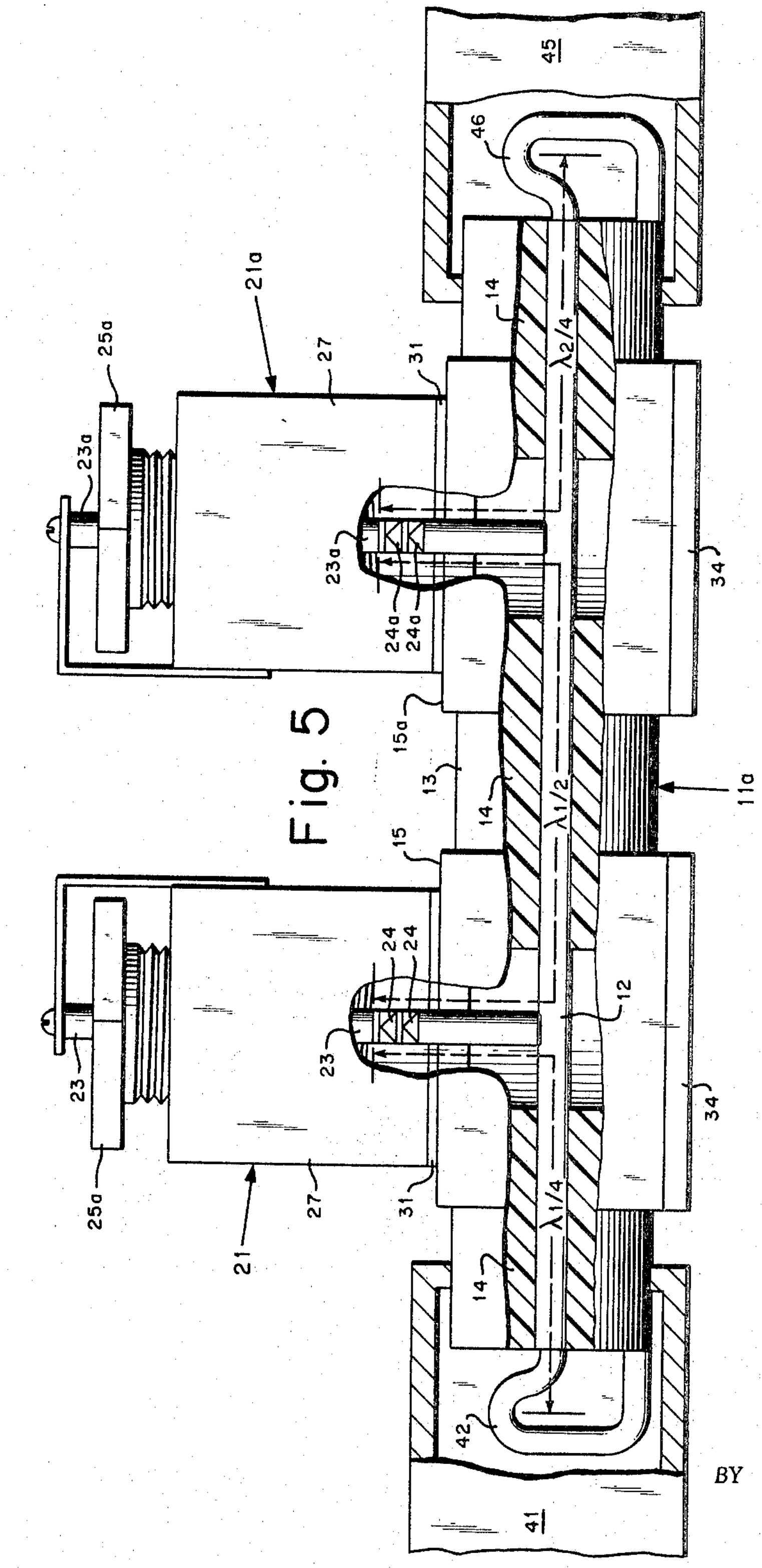
Figure 6:
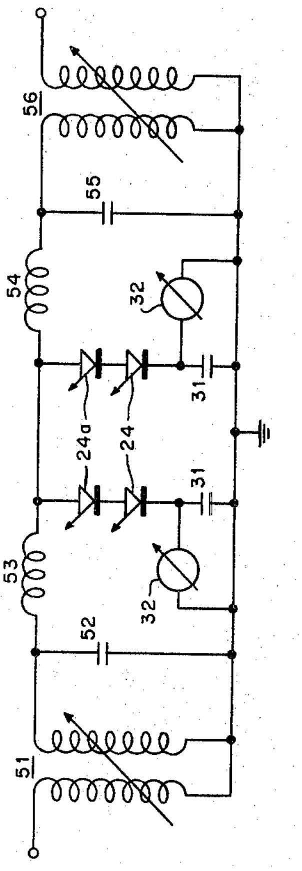

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 shows a section view of a varactor cartridge with input and output resonant cavities according to the present invention, FIG. 2 shows the equivalent electrical circuit of the cartridge according to FIG. 1, FIG. 3 shows a section of the output resonant cavity and cartridge along lines 3—3 of FIG. 1, FIG. 4 shows an elevation of a split locker shim in the cartridge of FIG. 1, FIG. 5 is a side elevation, partly broken away, of a harmonic generator using two varactor housings according to the invention in a "traveling wave" configuration, and FIG. 6 shows the equivalent circuit of FIG. 5.

In FIG. 1, there is shown a coaxial center conductor housing 11 comprising a center conductor 12 inside and coaxial with an outer conductive sheath 13 which is grounded. At the ends of center conductor 12 between conductor 12 and sheath 13 there is a filler 14 of a low loss dielectric such as polyethylene or Teflon. The outer sheath 13 is cylindrical except for a center portion 15 which is of rectangular cross section.

Mounted on the center conductor housing 11 at its center portion 15 is a varactor housing 21. In the center of the varactor housing 21 is a cross conductor comprising lower cross conductor 22 and upper cross conductor 23. Mounted between lower and upper cross conductors 22, 23 is one or more varactor diodes 24. The lower end of lower cross conductor 22 is attached electrically to the center conductor 12. Cross conductor 22, 23 is supported in the varactor housing by a lock mechanism comprising an upper bushing lock 25 and a lower bushing lock 26 threaded in a varactor housing sheath 27. Upper bushing lock 25 directly supports the upper cross conductor 23. Lower bushing lock 26 supports upper cross conductor 23 through the action of a locker shim 28 which is split as shown in FIG. 4. A spring 29 contained within upper and lower bushing locks 25, 26 presses down on shim 28 to force it in to grip upper cross conductor 23 tightly. As shown in FIG. 1, shim 28 is beveled on its lower edge and fits into a similarly shaped conical surface in lower bushing lock 26 so that downward force from spring 29 causes an inward force on shim 28. Due to the upward and downward forces on upper and lower bushing locks 25, 26 they are also pressed securely on the threading of outer sheath 27. Upper bushing lock 25 is prevented from rotation with respect to lower bushing lock 26 by a key 30 on bushing lock 25 which fits into a corresponding hole in lower bushing lock 26, as shown in FIG. 1. This enables lower bushing lock 26 to be threaded in and out of sheath 27 even though it itself is below the surface of sheath 27 and cannot directly be reached. Sheath 27 is mounted on center portion 15 of sheath 13 but separated therefrom by a capacitance material 31 which is a low loss dielectrical material such as Teflon or mica. A variable voltage source 32 is connected between the sheath 27 and sheath 13 to back bias diode 24. An L-shaped plate 33 is connected by suitable means between sheath 27 and the upper end of cross conductor 23 to hold conductor 23 in place to insure that it does not inadvertently slip out. At the bottom side of center section 15 of the coaxial center conductor housing 13 there is a plate 34 attached by suitable means which may be removed to allow access to the center connection cavity of housing 11 for a purpose which will be mentioned subsequently.

All of the materials of the cartridge except the filler 14 and the capacitance 31 are made of a high heat- and electricity-conductive material, preferably brass. Upper and lower cross conductors 23, 22 grip diode 24 firmly between them and contact it across the entire end surfaces thereof, for optimum heat conduction. The input end of the sheath 13 fits into an opening in a resonant cavity 41 which provides the input coupling for the cartridge. A loop of metal 42 is attached rotatably to the input end of center conductor 12. The other end of loop 42 contacts the sheath 13 slidably and since sheath 13 is cylindrical, the outer end of loop 42 may be rotated to contact sheath 13 at any angle. The opening in resonant cavity 41 into which the cylindrical sheath 13 fits is essentially the same size as the cylindrical sheath but is not fixedly attached thereto with the result that resonant cavity 41 is slidable with respect to sheath 13. By this means loop 42 may be positioned at varying degrees of insertion into resonant cavity 41, and the phase angle of loop 42 in the cavity 41 may be varied by rotation. A second loop 43 provides the input signal to the resonant cavity 41. Loop 43 is rotatably attached to the center conductor of a coaxial line 44 which is slidably inserted in a similar opening on the opposite end of resonant cavity 41. Coaxial line 44 may be a coaxial connector line from a signal source or the output end of a second coaxial cartridge similar to cartridge 11. In any event, coaxial line 44 terminating in loop 43 provides the input signal to the resonant cavity 41 which is picked up by loop 42 to be provided to the cartridge 11 in a manner which will be explained subsequently. At the output end of housing 11 there is another resonant cavity 45 with respect to which the output end of sheath 13 is slidable. Inserted in the output end of center conductor 12 is a loop 46 which is rotatable with respect to sheath 13 in the same manner as loop 42. A second loop 47 forms the output loop of resonant cavity 45. Loop 47 is attached rotatably to a coaxial line 48 which is similarly slidable with respect to resonant cavity 45. Coaxial line 48 may be the input end of another coaxial cartridge or a coaxial line connection to a desired signal output.

FIG. 2 shows the equivalent circuit of the varactor cartridge of FIG. 1. Variable transformer 51 represents the input coupling of the resonant cavity 41, and capacitance 52 and inductance 53 represent the effective capacitance and inductance of the input leg of the varactor cartridge itself. Capacitor 31 is the capacitance 31 shown in FIG. 1 comprising the mica or Teflon ring separating housing 27 from housing 13. Inductance 54 and capacitance 55 are the effective inductance and capacitance of the output leg of the varactor cartridge. Variable transformer 56 represents the effective coupling of the output resonant cavity 45.

FIG. 5 shows the configuration of a coaxial cartridge used as a traveling wave multiplier. In this configuration there are a plurality of varactor housings **21, 21*a* mounted on a single center conductor housing 11*a*. Sheath 13 will be cylindrical as before except for a plurality of raised rectangular sections 15, 15*a* on each of which is mounted through a capacitance 31 a housing 21, 21*a*. The housing 21, 21*a* in each case is identical to the housing 21 in FIG. 1 for the single housing configuration. The details of the locking means in each of the bushing locks 25*a* have not been shown but are identical in structure to those in FIG. 1. In FIG. 5 also there is shown a plurality of diodes 24, 24*a* in series in each of the housings between upper cross conductor 23, 23*a* and lower cross conductor 22, 22*a*. The use of a plurality of diodes increases the power output ability of the varactor cartridge as does the use of the traveling wave multiplier configuration. FIG. 6 shows the equivalent circuit for the traveling wave multiplier configuration shown in FIG. 5. All parts are the same as in FIG. 2, with the exception of a plurality of varactor legs with their accompanying capacitances 31 and biases 32**.

The length of lower cross conductors **22, 22*a* and upper cross conductors 23, 23*a* will in general be the same. The input frequency will determine the length of the input leg in that the distance from the geometric center of loop 42 to the junction of diode 24 measured through the center conductor and up the cross conductor 22 is equal to the wave length of the input frequency $\lambda_1$, divided by four, represented by $\lambda_1/4$. The distance from the junction of diode 24 through lower cross conductor 22, center conductor 12 and up lower cross conductor 22*a* to the junction of diode 24*a* in the second column is equal to one-half of the wave length of the input frequency. The distance from the junction of diode 24*a* in the second column to the geometric center of output loop 46 represents one-fourth of the wave length of the output frequency, $\lambda_2$, which for a doubler would be one-half the wave length of the input wave length. This relationship is fixed according to the construction of the varactor cartridge itself and is not in general variable except by adjusting slightly the positions of loops 42 and 46. It should be noted that rotating loops 42 and 46 in their respective resonant cavities does not change these critical distances $\lambda_1/4$ and $\lambda_2/4$. It will be noted that these critical distances are the same in FIG. 1 as they are in FIG. 5, with the elimination of the center half wave length from diode 24 in the first housing to diode 24***a* in the second housing.

The varactor cartridge is tuned in the following manner taken with reference to FIG. 1. Diode 24 is biased by bias supply 32 to an impedance which will center it with respect to the input frequency between forward conduction on the one end and breakdown conduction at the opposite end. At this bias and at the input frequency, the diode 24 will have some capacitance in general over and above the inductive effect within the diode. By variation of the sliding short caused by lower bushing lock 26, an inductance is created above the diode in the varactor housing. By appropriate tuning of this inductance, the capacitive effect of diode 24 can be effectively nullified leaving diode 24 biased at the optimum point of its range of operation and yet having its net capacitance effectively canceled out. The matching of the impedances of the input leg of the varactor cartridge will then follow the formula $$Z_2=\sqrt{Z_1\times Z_3}$$

where $Z_2$ is the characteristic impedance of the input leg of the cartridge and is fixed, $Z_3$ is the characteristic impedance of the varactor at the particular chosen bias point and is also fixed, and $Z_1$ is the output impedance of the input cavity, which is determined by loop 42 in resonant cavity 41. Since loop 42 may be adjusted in the depth of its insertion into resonant cavity 41 and may be rotated in phase $Z_1$ is therefore variable, and by appropriate adjustment both of the phase angle of loop 42 and the depth of insertion, the impedance of the output loop of the resonant cavity can be tuned to the input leg of the varactor cartridge. Similarly, loop 46 on the output leg of the varactor cartridge may be adjusted to tune the output loop of the output leg of the varactor cartridge to the impedance $Z_3'$ of diode 24 and $Z_2'$ of the output leg of the cartridge according to the formula $Z_2'=\sqrt{Z_1'\times Z_3'}$ where $Z_2'$ equals the characteristic impedance of the output leg, $Z_1'$ equals the impedance of leg 46 in the output leg, and $Z_3'$ is the impedance of varactor diode 24 at the output frequency.

The heat sinking of diode 24 or, in the case of FIG. 5, diodes 24 and 24*a* is done through the lower and upper cross conductors 22 and 23 since both lower and upper cross conductors 22, 23 abut the diode or diodes with solid metal to diode contact. This is vital inasmuch as a considerable bit of the power handling capacity of a diode will be determined by its heat dissipation properties. For this reason, large power harmonic generation demands adequate provision of heat dissipation.

In the case of a tripler or quadrupler it is important for high efficiency conversion that the idler frequency which is twice the input frequency be shorted to ground. For this purpose plate 34 may be removed and a coaxial bandpass filter tuned to the frequency twice the input frequency will be connected through the bottom opening between the center conductor 12 and ground. By means of this filter all of the frequency which is twice the fundamental frequency will be shorted out and all of the power will be applied to the output frequency which is three times the fundamental frequency or four times the fundamental frequency, as the case may be.

Varactor diodes are not the only diodes which are usable in the cartridge of the present invention. Diode 24 may instead be a snap action diode, which will cause the output frequency to be roughly in the shape of a square wave. It is known that square waves contain large quantities of higher harmonics and with appropriate use of bandpass filters for the intermediate frequencies, generation of high harmonics can be done with a single cartridge. On one actual case using a snap diode for diode 24, an efficient multiply-by-12 harmonic generator was produced. With appropriate choice of the length of the input and output legs the cartridge itself acts as a filter thereby producing an efficient multiply-by-12 generator without the use of extensive coaxial bandpass filters.

The use of plural diodes in a single housing is feasible if the size of the diode package is not a significant length compared to the wave length of the output frequency. In general, if the output frequency is below 3000 megacycles, two varactor diodes of the double ended package type may be stacked in a cartridge.

It will be noted that the varactor connection in the cartridges of the present invention is in a shunt configuration. It is possible to operate a harmonic generator placing the diode in a series configuration. However, it may be shown that the shunt configuration permits the cartridge to be used at higher powers and is therefore preferred.

It will be understood that various changes in the details, materials, steps and arrangement of parts which have been herein described and illustrated in order to explain the nature of the invention may be made by those skilled in the art within the principle and scope of the invention as expressed in the appended claims.

We claim:

1. A coaxial diode cartridge comprising:
   a coaxial line having a center conductor and a conductive outer sheath coaxial therewith and separated therefrom;
   a cross conductor connected at one end to said center conductor between its ends;
   a diode in said cross conductor between its ends;
   means to connect said cross conductor to said sheath at a point on said cross conductor beyond said diode from said center conductor;
   an input loop and an output loop each being rotatably attached to said center conductor at respective ends thereof and connected slidably to said outer sheath; and
   an input resonant cavity and an output resonant cavity each being connected to said coaxial line and each containing a respective one of said loops and being slidable with respect thereto.

2. A coaxial diode cartridge comprising:
   a coaxial line having a center conductor and a conductive outer sheath coaxial therewith and separated therefrom;
   a cross conductor connected at one end to said center conductor between its ends;
   a diode in said cross conductor between its ends;
   connecting means to connect said cross conductor to said sheath at a point on said cross conductor beyond said diode from said center conductor;
   an input loop rotatably attached to said center conductor at one end thereof and connected slidably to said outer sheath, the distance from the geometric center of the input loop along the center conductor and up the cross conductor to the junction of said diode being one-quarter of the wavelength of an input frequency;
   an output loop rotatably attached to said center conductor at the other end thereof and connected slidably to said outer sheath, the distance from the junction of said diode down the cross conductor along the center conductor to the geometric center of said output loop being one-quarter the wavelength of an output frequency; said output frequency being an integral multiple of said input frequency; and
   an input resonant cavity and an output resonant cavity each being connected to said coaxial line and each containing a respective one of said loops and being slidable with respect thereto.

3. A coaxial diode cartridge as recited in claim 2 wherein said diode is a snap diode having a conductive state and a nonconductive state; and wherein said integral multiple is greater than four.

4. A coaxial diode cartridge as recited in claim 2 further comprising:

a capacitance between said sheath and said connecting means to said cross conductor beyond said diode; and a source of bias connected between said sheath and said connection to said cross conductor to reverse bias said diode, said diode being a variable capacitance diode.

5. A coaxial diode cartridge as recited in claim 4 wherein said connecting means comprises:

an outer diode housing surrounding said cross conductor and coaxial therewith, said capacitance being between said outer diode housing and said sheath; and an electrical short between said outer diode housing and said cross conductor beyond said diode.

6. A coaxial diode cartridge as recited in claim 5 wherein the position of said short on said cross conductor is variable along the length of said cross conductor.

7. A coaxial diode cartridge as recited in claim 6 further comprising:

a lock means to hold said variable short physically and electrically grounded between said outer diode housing and said cross conductor and physically clamped thereto.

8. A coaxial diode cartridge as recited in claim 7 wherein said lock means comprises:

means between said outer diode housing and said cross conductor attached to said housing and clamped on said cross conductor.

9. A coaxial diode cartridge as recited in claim 8 wherein said clamping means is a spring biased split shim.

10. A coaxial diode cartridge as recited in claim 9 further comprising:

a lower bushing lock positioned within said outer diode housing around said conductor, said lower bushing lock having within it a beveled seat around said cross conductor, said shim being beveled and seated within said beveled seat in said bushing lock and spring biased downwardly with respect thereto.

11. A coaxial diode cartridge as recited in claim 10 further comprising:

an upper bushing lock positioned within said outer diode housing and surrounding said cross conductor; and a spring positioned compressively between said upper and lower bushing locks.

12. A coaxial diode cartridge as recited in claim 11 wherein said upper and lower bushing locks are threaded within said outer diode housing and keyed to prevent relative rotation with respect to each other.

13. A coaxial diode cartridge as recited in claim 4 wherein there are a plurality of diodes serially connected in said cross conductor.

14. A coaxial diode cartridge as recited in claim 1 further comprising:

a plurality of diode housings capacitively connected to said outer sheath;

a plurality of cross conductors each within one of said housings and connected at one end of each to said center conductor between its ends;

a diode in each of said cross conductors, the distance along the center and cross conductors between the geometric center of the input loop and the junction of the first diode being a quarter wavelength at the input frequency, the distance between the junction of each diode and the next successive diode along the cross conductors and the center conductor being a half wavelength at the input frequency and the distance between the junction of the last diode along the cross conductor and the center conductor to the geometric center of the output loop being a quarter wavelength at the output frequency.

15. A coaxial diode cartridge comprising:

a coaxial line having a center conductor and a conductive outer sheath coaxial therewith and separated therefrom;

a cross conductor connected at one end to said center conductor between its ends;

a variable capacitance diode in said cross conductor between its ends;

connecting means connected to said cross conductor at a point on said cross conductor beyond said diode from said center conductor;

a capacitance connected between said connecting means and said sheath;

a source of bias connected between said connecting means and said sheath to reverse bias said diode;

means to couple on one end of said center conductor an input frequency; and means to couple from the other end of said center conductor an output frequency.

16. A coaxial diode cartridge as recited in claim 15 wherein said connecting means comprises:

an outer diode housing surrounding said cross conductor and coaxial therewith, said capacitance being between said outer diode housing and said sheath; and an electrical short between said outer diode housing and said cross conductor beyond said diode.

17. A coaxial diode cartridge as recited in claim 16 wherein the position of said short on said cross conductor is variable along the length of said cross conductor.

18. A coaxial diode cartridge as recited in claim 17 further comprising:

a lock means to hold said variable short physically and electrically grounded between said outer diode housing and said cross conductor and physically clamped thereto.

19. A coaxial diode cartridge as recited in claim 18 wherein said lock means comprises:

means between said outer diode housing and said cross conductor attached to said housing and clamped on said cross conductor.

20. A coaxial diode cartridge as recited in claim 19 wherein said clamping means is a spring biased split shim.

21. A coaxial diode cartridge as recited in claim 20 further comprising:

a lower bushing lock positioned within said outer diode housing around said conductor, said lower bushing lock having within it a beveled seat around said cross conductor, said shim being beveled and seated within said beveled seat in said bushing lock and spring biased downwardly with respect thereto.

22. A coaxial diode cartridge as recited in claim 21 further comprising:

an upper bushing lock positioned within said outer diode housing and surrounding said cross conductor; and a spring positioned compressively between said upper and lower bushing locks.

23. A coaxial diode cartridge as recited in claim 22 wherein said upper and lower bushing locks are threaded within said outer diode housing and keyed to prevent relative rotation with respect to each other.

24. A coaxial diode cartridge as recited in claim 23 wherein there are a plurality of diodes serially connected in said cross conductor.

References Cited

UNITED STATES PATENTS

| | | | |
|---|---|---|---|
| 3,085,205 | 4/1963 | Sante | 328—16 |
| 3,278,868 | 10/1966 | Kach | 333—83 |
| 3,281,648 | 10/1966 | Collins | 321—69 |
| 3,287,621 | 11/1966 | Weaver | 321—69 |

JOHN F. COUCH, *Primary Examiner.*

G. GOLDBERG, *Assistant Examiner.*